March 1, 1960 J. C. SANDERS 2,926,524
METHOD AND MECHANISM FOR DETECTING
STALL AND SURGE OF GAS ENGINES
Filed Jan. 12, 1956

INVENTOR
JOHN C. SANDERS

BY

ATTORNEYS

United States Patent Office 2,926,524
Patented Mar. 1, 1960

2,926,524

METHOD AND MECHANISM FOR DETECTING STALL AND SURGE OF GAS ENGINES

John C. Sanders, Cleveland Heights, Ohio

Application January 12, 1956, Serial No. 558,813

9 Claims. (Cl. 73—116)

(Granted under Title 35, U.S. Code (1952), sec. 266)

The invention described herein may be manufactured and used by or for the Government of the United States of America for governmental purposes without the payment of any royalties thereon or therefor.

The present invention relates to a method and mechanism for detecting stall and surge of gas engines.

Stall or surge of an engine produces characteristic pressure oscillations that occur in most flow passages throughout the engine. The present invention relates to a method and mechanism which are responsive to these pressure oscillations to produce a signal that may be used as a warning or indication, or may be transmitted to a control device that corrects the fuel flow, inlet guide vanes, or compressor bleed in such a manner that the engine recovers from the initiating stall or surge.

Accordingly, an object of the present invention is the provision of a method and mechanism for the detection of stall and surge in gas engines.

Another object is to provide a method and mechanism that detects stall or surge of gas engines and emits a signal that may be used as an indication and as a control signal to energize mechanisms for recovering the engines from the initiating stall or surge.

Other objects and many of the attendant advantages of this invention will be readily appreciated as the same becomes better understood by reference to the following detailed description when considered in connection with the accompanying drawings wherein.

Figure 1:
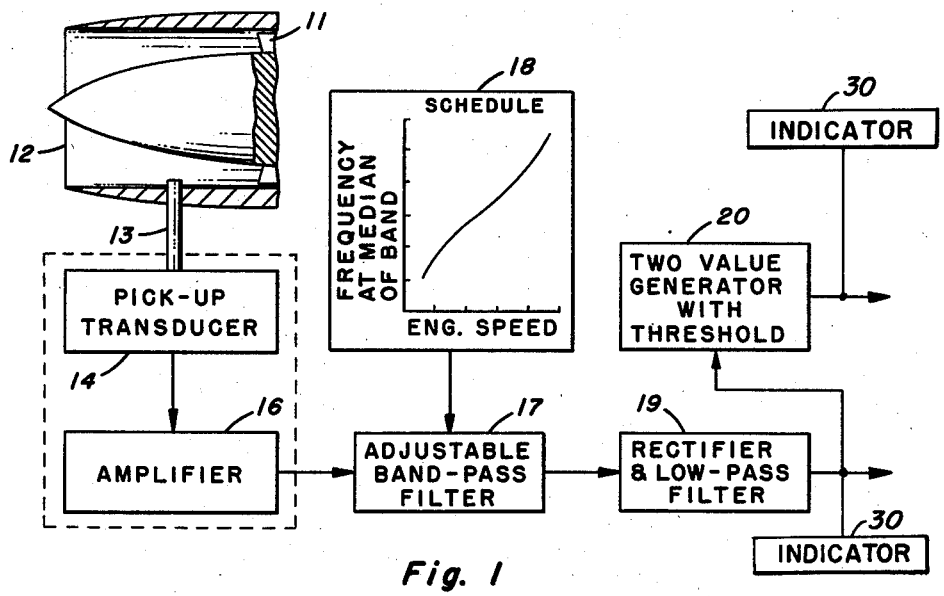
Fig. 1 shows a block diagram of a preferred embodiment of the invention.

Referring now to the drawings, wherein like reference characters designate like or corresponding parts throughout the several views, there is shown in Fig. 1 (which illustrates a preferred embodiment) a fragmentary portion of an axial compressor 11 having an inlet annulus 12 in which the pressure is sensed by a pressure sensing probe 13. A pick-up transducer 14 converts the sensed pressure characteristic into electrical, mechanical, or other type signals suitable for amplification by amplifier 16. The pressure-sensor combination (probe 13 and transducer 14) is capable of sensing pressure variations from one cycle up to the fundamental of the engine rotor speed (about 60 cycles per second on large turbojet engines). An available device suitable for the sensor-amplifier combination is a Statham pressure transducer coupled to a Brush Development Company Universal Amplifier BL–360.

The signal from the sensor-amplifier system passes into a band-pass filter 17, which is preferably but not necessarily adjustable, wherein the low frequencies are removed to eliminate noise originating from change in altitude, angle of attack, or engine air flow. High frequencies are also removed to minimize noise arising from combustion, mechanical vibration, and other sources. As an optimum choice of band-pass spectrum can not be fixed, the band-pass should be automatically adjusted as a function of engine speed. This filtering may be accomplished electrically or mechanically. Adjustable band-pass filters such as the Model 330–A made by the Kron-Hite Instrument Company are suitable. Mechanical filtering can be achieved by proportioning the length and diameter of the probe to cut off high frequencies. Low frequency cut-off can be achieved in various ways, such as by proportioning a bleed passage between the two sides of the pressure pick-up sensing element.

The schedule 18 of filter band-pass with engine speed is provided to control the frequency of the median band of the band-pass filter 17 so that the unwanted signals or noise will be suppressed. The width of the band-pass at any one speed can be quite narrow (less than 10 percent of the median frequency of the band); however, for adequate noise suppression the median frequency varies considerably with engine speed. Therefore, it is desirable to change the band-pass median frequency of filter 17 with changes in engine speed. Scheduling devices giving voltages, pressures, or shaft rotations as scheduled functions of some measured variable are frequently used in acceleration controls on turbojet engines, and thus need not be shown in detail. For example, the tachometer on the engine could produce a voltage that positions a servomotor driving a specially contoured cam. The cam would have a shape that represents the schedule of median band frequency. The cam follower could be geared to the tuning knob of the variable filter, such as the Kron-Hite band-pass filter.

The filtered signal enters a conventional rectifier-filter combination 19 that produces a low-frequency signal proportional to the peak voltage swings, in the case of an electrical circuit, or mechanical movement swings, for a mechanical embodiment, from the band-pass filter 17. This signal from the rectifier-filter system 19 has a very low value when the engine is operating normally, but a high value when stall or surge conditions exist in the engine. The rectifier and low-pass filter principle is well known in fields of electricity, mechanics, hydraulics, and pneumatics. Among electrical rectifiers, the dry disc, thermionic, or gaseous types can be used. A filter consisting of shorting capacitances and series inductances, calculated to have a cut-off frequency which will be the highest that will not pass interfering frequencies from engine surge (approximately 5 cycles per second), is suitable.

The signal from filter 19 can be employed directly or indirectly by means of a two-value generator 20 to give an indication or warning or to energize devices that correct the fuel flow, inlet guide vanes, or compressor bleed. Generator 20 may be used in situations where only a two-valued signal, indicating only the presence or absence of stall or surge, is needed. A relay or a mono-stable flip-flop circuit that trips from one state to another when the input signal rises above some selected threshold value may be employed. When the signal from the rectifier-filter 19 falls below the threshold value the relay, or similar device, returns to its original state. As suggested above, signals from rectifier-filter 19 and generator 20 may be applied to appropriate indicators 30.

Figure 2:
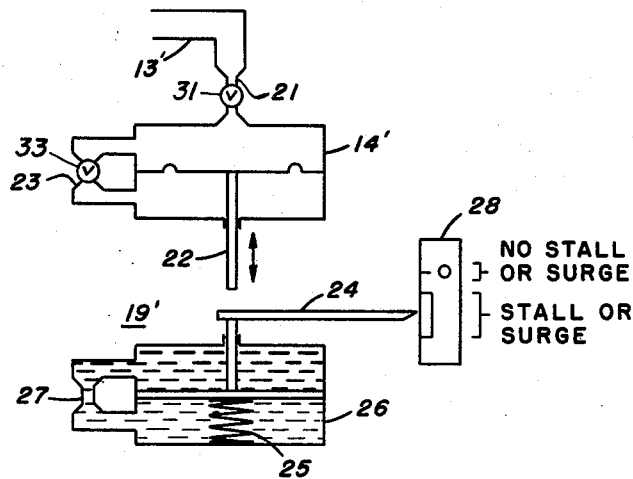
Fig. 2 illustrates a suitable mechanical embodiment of the present invention.

In electrical systems, the operational elements that transform the information are readily identified; thus, electrical components for each block of the system of Fig. 1 are well known. The elements in mechanical systems are not so easily identified, but the operations performed on the circulating information are the same. One suitable mechanical system is shown in Fig. 2. The pressure probe 13' has a passage 21, the length and diameter of which are adjusted for high frequency cut-off. A transducer 14' comprising a diaphragm-type pressure sensor converts the pressure signals from probe 13' into axial motion of hammer 22. There is a bleed passage 23 in transducer 14' that is adjusted for low frequency cut-off. The passages 21 and 23, though shown to have fixed dimensions, preferably have areas that are adjustable by some suitable means, as for example, valves 31, 33 that are controlled according to a schedule that is a function of engine speed. An anvil 24, which is spring-loaded by means of spring 25, cooperates with hammer 22 to provide a rectifier action. Oil dash pot 26 with shunting passage 27 comprises a low-pass filter that removes interfering frequencies due to engine surge. Indicator scale 28 is placed adjacent a pointed end of anvil 24 and in conjunction with this anvil provides an indication of the presence or absence of stall or surge. The quiescent position of anvil 24 is against hammer 22 at the zero mark on indicator 28. Upon the occurrence of stall or surge, disturbances in the compressor in which probe 13' is situated will be generated and through transducer 14 will cause hammer 22 to oscillate axially but it is evident that anvil 24 will be sensitive to only the peak downward movements of hammer 22 and hence will provide a rectifier action. The displacement of the pointed end of anvil 24 away from the zero mark on indicator 28 is an indication of the presence of stall or surge. It is apparent that the movement of anvil 24 could also be employed to produce a control function through the medium of a rheostat or the like.

A stall and surge sensor has been disclosed which detects oscillations in gas pressures in engines, and through suitable filtering transmits signals with frequency characteristics of surge and stall, but rejects other signals. The presence of signals having these characteristic frequencies is thus an indication of the presence of stall or surge. The pressure pick-up probe 13, in Fig. 1, has been shown for sensing total pressure in the inlet annulus of a compressor, but it is to be understood that these characteristic pressure oscillations occur in most flow passages throughout the engine and thus can be detected at various points. It is advantageous to use a total pressure probe in the inlet duct to the compressor, in the inlet annulus of the compressor, or in the first compressor stage upstream of the rotor. These locations are desirable because disturbances resulting from manipulation of the fuel flow will not be present within the frequency spectrum used by the surge sensor; therefore, requirements on the filters are less severe. Since the pressure waves are of sufficiently high frequency to produce nonstationary flow, the oscillations would appear in measurement of total pressure, static pressure, or velocity head. Any of these quantities can be sensed.

Obviously many modifications and variations of the present invention are possible in the light of the above teachings. It is therefore to be understood that within the scope of the appended claims the invention may be practiced otherwise than as specifically described.

What is claimed is:

1. A stall and surge detector for a gas turbine engine comprising: probe means for sensing gas pressure oscillations in the inlet annulus of a compressor for a gas turbine engine, a transducer connected to the output of said probe means for producing a utilizable signal that is a function of the sensed gas pressure oscillations, filter means coupled to said transducer and having a band-pass selected to reject all frequency components not characteristic of engine stall or surge and rectifier-filter means coupled to said filter means for producing a low frequency signal that is proportional to the peak swings of the output from said filter means.

2. The stall and surge detector of claim 1 and indicator means connected to utilize the output of said rectifier-filter means to give an indication of stall or surge.

3. The stall and surge detector of claim 1 and two-value signal generating means connected to utilize the output of said rectifier-filter means to produce one response in the absence of stall and surge and to produce another response different from said one response in the presence of stall or surge.

4. A stall and surge detector for gas turbine engines comprising: probe means for sensing gas pressure oscillation in the inlet annulus of a compressor for a gas turbine engine, transducer means for producing an output signal that corresponds to the gas pressure oscillations sensed by said probe means, amplifier means for amplifying said output signal, adjustable band-pass filter means connected to filter the output from said amplifier means, scheduling means coupled to control the median frequency of said adjustable band-pass means as a function of engine speed to reject frequency components not characteristic of compressor stall or surge, and rectifier-filter means connected to produce a low frequency signal proportional to the peak swings of the output from said adjustable band-pass filter means.

5. The stall and surge detector of claim 4 and means for utilizing said low frequency signal to give an indication of stall or surge.

6. The stall and surge detector of claim 4 and two-value signal generating means connected to utilize said low frequency signal to produce one response in the absence of stall or surge and to produce another response different from said one response in the presence of stall or surge.

7. A stall and surge detector for gas turbine engines comprising: a total pressure sensor for sensing gas pressure variations in said gas turbine engines from one cycle per second up to the fundamental of engine rotor speed, transducer means for producing an output signal that corresponds to the gas pressure variations sensed by said total pressure sensor, amplifier means for amplifying said output signal, adjustable band-pass filter means connected to filter the output from said amplifier means, scheduling means coupled to control the median frequency of said band-pass filter means in a manner such that irrespective of the engine speed said band-pass filter removes all frequency components not characteristic of engine stall or surge, and rectifier-filter means connected to produce a low frequency signal proportional to the peak swings of the output from said adjustable band-pass filter means.

8. A detector comprising: a pressure probe for sensing pressure oscillations that occur in the environment in which the pressure probe is located, said pressure probe having a passage whose length and diameter are adjusted for high frequency cut-off; a hammer; diaphragm type transducer means for converting pressure oscillations from said probe into axial motion of said hammer, said transducer having a passage joining the two sides of the transducer the length and diameter of which are such as to provide low-frequency cut-off; an anvil; an oil dash pot for providing a damped axial-motion mounting for said anvil, said oil dash pot having a passage the length and diameter of which are adjusted for cut-off above 5 cycles per second; a spring in said dash pot for urging said anvil to a position against said hammer; and an indicator adjacent said anvil.

9. A method of detecting stall or surge in gas turbine engines which comprises the steps of measuring the gas pressure oscillations which occur in a flow passage of said engine, producing a signal that varies in accordance with said gas pressure oscillations, modifying said signal by removing therefrom frequency components not characteristic of engine stall or surge, and utilizing said modified signal to actuate an indicator.

References Cited in the file of this patent

UNITED STATES PATENTS 2,176,807    Wunsch            Oct. 17, 1939

(Other references on following page)

UNITED STATES PATENTS

| | | |
|---|---|---|
| 2,319,011 | Meredith | May 11, 1943 |
| 2,637,999 | Klebba | May 12, 1953 |
| 2,715,717 | Keithley et al. | Aug. 16, 1955 |
| 2,725,548 | Harris | Nov. 29, 1955 |
| 2,730,896 | Boisblanc | Jan. 17, 1956 |

FOREIGN PATENTS

| | | |
|---|---|---|
| 489,835 | Canada | Jan. 20, 1953 |

OTHER REFERENCES

Instruments & Automation, vol. 27, August 1954. Article: "Jet Engine Testing," by Burdett et al. (pages 1294–1295).